United States Patent [19]

Genest

[11] Patent Number: 4,710,312

[45] Date of Patent: Dec. 1, 1987

[54] STABLE MIXTURES OF CHLOROFLUOROHYDROCARBONS AND SOLVENTS AND THEIR USE AS HEAT TRANSFER COMPOSITIONS FOR ABSORPTION HEAT PUMPS

[75] Inventor: Bernard Genest, Paris, France

[73] Assignee: Gaz De France, France

[21] Appl. No.: 751,783

[22] Filed: Jul. 3, 1985

[30] Foreign Application Priority Data

Jul. 6, 1984 [FR] France ................................. 84 10813

[51] Int. Cl.$^4$ ................................................. C09K 5/04
[52] U.S. Cl. ................................. 252/68; 252/32.7 R; 252/69; 252/389.22; 252/400.22; 62/112; 62/114
[58] Field of Search .................... 62/112, 114; 252/68, 252/69, 32.7 R, 389.22, 400.22

[56] References Cited

U.S. PATENT DOCUMENTS

| | | | |
|---|---|---|---|
| 3,375,197 | 3/1968 | Spauschus et al. | 252/68 |
| 4,179,389 | 12/1979 | Mann | 252/75 |
| 4,454,052 | 6/1984 | Shoji et al. | 252/68 |
| 4,455,247 | 6/1984 | Nakayama et al. | 252/68 |
| 4,557,850 | 12/1985 | Ando et al. | 252/68 |

FOREIGN PATENT DOCUMENTS 11035 1/1983 Japan.

*Primary Examiner*—Robert A. Wax
*Attorney, Agent, or Firm*—Brooks Haidt Haffner & Delahunty

[57] ABSTRACT

The present invention relates to stable mixtures comprising a chlorofluorohydrocarbon as a heat transfer fluid, an amide or glycol ether compound as a solvent, and a zinc dialkyldithiophosphate as a stabilizer. The invention also relates to the use of these mixtures as heat transfer compositions for absorption heat pumps.

17 Claims, No Drawings

STABLE MIXTURES OF CHLOROFLUOROHYDROCARBONS AND SOLVENTS AND THEIR USE AS HEAT TRANSFER COMPOSITIONS FOR ABSORPTION HEAT PUMPS

The present invention relates to the field of heating or refrigeration using absorption systems such as absorption heat pumps. It relates more particularly to the application of stable mixtures of chlorofluorohydrocarbons/solvents as heat transfer (or heat carrying) compositions for absorption heat pumps.

Absorption heat pumps are nowadays widely used especially for heating buildings.

The principle of the absorption cycle of these pumps is as follows:

A working fluid or heat transfer fluid (F), initially in the gaseous state, is subjected to steps involving condensation, expansion, vaporization and then absorption in a solvent fluid (S). The solution obtained is repressurized and the working fluid (F) can be regenerated in the gaseous state by raising the temperature; the solvent is then returned to the absorption step.

The most widely used working fluid/solvent fluid combinations are $NH_3/H_2O$ and $H_2O/LiBr$. However, these combinations have major disadvantages which prevent them from being used in certain fields, especially in the field of individual or district heating. In fact, the use of the thermodynamically advantageous combination $NH_3/H_2O$ is restricted by the toxicity of $NH_3$. Because of crystallization of the water, the combination $H_2O/LiBr$ cannot be used at the low temperature required for the vaporator in the case of application in heat pumps for individual or district heating.

In an absorption cycle, it is important for the working fluid/solvent fluid combination to have good thermodynamic properties and a good solubility of the working fluid or heat transfer fluid in the solvent, to be non-toxic and not to present any risk of crystallization.

It has already been proposed for this purpose to use fluorohydrocarbons as heat transfer fluids with high-molecular compounds as solvents (revue Générale de Thermique—No. 236-237, August–September 1981).

The use of these heat transfer fluid/solvent fluid combinations in an absorption cycle is of definite value, in particular because of the very high solubility of the heat transfer fluid in the solvent. However, such combinations decompose at high temperatures when they are in contact with a metal compound, whereas each constituent of the combination is heat-stable under the same conditions. Now, it is of prime importance, for a heating installation incorporating an absorption cycle, that the heat transfer fluid/solvent system should be stable for a period equivalent to a working life of 10 years.

It has now been found that stable mixtures of chlorofluorohydrocarbons and solvents are particularly suitable as heat transfer compositions for absorption heat pumps.

The heat transfer compositions suitable for the purposes of the invention are mixtures comprising a chlorofluorohydrocarbon as a heat transfer fluid, a compound of the amide or glycol ether type as a solvent, and a zinc dialkyl-dithiophosphate, as a stabilizer.

The chlorofluorohydrocarbons suitable for the purposes of the invention are hydrocarbons having from 1 to 3 carbon atoms, which are partially hydrogenated, i.e. possess at least one hydrogen atom, and which have a boiling point of between $-45°$ C. and $+60°$ C.

The following may be mentioned as examples of chlorofluorohydrocarbons which can be used according to the invention: chlorodifluoromethane, dichlorofluoromethane, chlorofluoromethane, 1-chloro-2,2,2-trifluoroethane, 1,1-dichloro-2,2,2-trifluoroethane, 1-chloro-1,2,2,2-tetrafluoroethane, 1,1-dichloro-2,2-difluoroethane, 1-chloro-1,2,2-trifluoroethane, 1-chloro-2,2-difluoroethane and isomers and mixtures thereof. The particularly preferred hydrocarbon is 1-chloro-1,2,2,2-tetrafluoroethane.

The solvent fluid used in the heat transfer composition according to the invention is:

either a compound of the amide type, i.e. a compound having at least one $N-C=O$ bond, such as, for example, N,N-dimethylformamide, N,N-diethylformamide, N-methylpyrrolidone, N,N-dimethylpropionamide and mixtures thereof, the preferred solvent being N-methylpyrrolidone;

or a glycol ether such as triethylene glycol dimethyl ether or tetraethylene glycol dimethyl ether.

The solvent fluid used in the composition according to the invention advantageously has a boiling point at least 150° C. higher then the boiling point of the heat transfer fluid.

The relative quantities of heat transfer fluid and solvent fluid in the composition according to the invention are not critical. They are determined in a known manner, mainly according to the working conditions of the absorption cycle.

Advantageously, 10 to 60 parts by weight of heat transfer fluid are used, relative to the weight of the total mixture.

The stabilizer used in the compositions of the invention is a zinc dialkyl-dithiophosphate corresponding to the chemical formula:

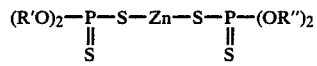

in which R' and R", which are identical or different, represent alkyl, aryl, alkylaryl or arylalkyl radicals containing at least 3 carbon atoms and preferably at least 6 carbon atoms.

The stabilizer used must not alter the thermodynamic properties of the heat transfer fluid/solvent fluid combination.

However, the quantity of this stabilizer must be sufficient to inhibit the decomposition of the heat transfer fluid/solvent fluid combination at temperatures ranging up to 180° C.

The quantity of stabilizer is preferably within the range between 0.05 and 2.5% by weight, relative to the weight of the solvent in the composition, a quantity of 0.5 to 2% being preferred.

The mixture of chlorofluorohydrocarbons and solvents which is suitable as a heat transfer composition for absorption heat pumps, according to the invention, is stable at high temperatures, even in contact with the materials commonly used for the industrial production of the absorption machines, such as ordinary steel, stainless steel, aluminium and its alloys, cast iron, copper, brass and the like.

The chlorofluorohydrocarbons used according to the invention have a very high solubility in the solvents defined above. In fact, it is thought that the high solubility is due to hydrogen bonds which form between the hydrogen of the partially hydrogenated chlorofluorohydrocarbon and the oxygen and nitrogen of the amide group or the oxygen of the ether group of the solvent, although this particular theory is not intended to be restrictive. The hydrogen bond is strengthened by the presence of a chlorine atom attached to the same carbon as the hydrogen in the hydrocarbon.

The stabilizer chosen for the purposes of the invention inhibits the complex mechanisms of thermal decomposition of these hydrocarbon/solvent systems, which are catalyzed by metals at temperatures above 140° C.

The present invention also relates, by way of new products, to the stabilized heat transfer compositions comprising a mixture of a heat transfer chlorofluorohydrocarbon, an amide or glycol ether compound as a solvent, and, as a stabilizer, a zinc dialkyl-dithio-phosphate as defined above.

The invention will now be described in greater detail by the examples below.

EXAMPLE 1

A composition according to the invention was formed by mixing: 5 mmol of 1-chloro-1,2,2,2-tetrafluoroethane (hereafter called R124); 3 g of N-methylpyrrolidone (NMP); and 1.5% relative to the weight of NMP, of zinc dialkyl dithiophosphate (alkyl=$C_4$ to $C_8$), and the stability of this composition was tested for 100 hours at 180° C. using the following procedure: the mixture was introduced into a thick-walled pyrex tube containing a suitably cleaned metal test-piece consisting of 250 mg of ordinary steel. The tube was cooled to the temperature of liquid nitrogen, sealed in vacuo and heated at a temperature of 180° C. for 100 hours.

The tube was then re-immersed in liquid nitrogen, connected to a row of vacuum cocks and opened with the aid of an appropriate device. The contents of this tube were recovered in the liquid and gaseous form and analyzed by gas chromatography, enabling the percentage decomposition of the heat transfer fluid to be determined. The weight loss of the metal test-piece could not be measured as it was less than the sensitivity of the balance (0.1 mg).

The results obtained are collated in the table below.

TABLE I

| Temperature | Duration | Tradename of stabilizer | % Decomposition of the heat transfer fluid |
|---|---|---|---|
| 180° C. | 100 h | OLOA 267 | 0.9% |
| 180° C. | 100 h | OLOA 4269 | 0.1% |
| 180° C. | 100 h | OLOA 262 | 0.9% |

The zinc dialkyl-dithiophosphates used in this example are marketed by ORO GIL under the tradename OLOA.

EXAMPLE 2

Example 1 was repeated using 1-chloro-2,2,2-trifluoroethane as the fluorochlorohydrocarbon and zinc dialkyl-dithiophosphate (alkyl=$C_4$ to $C_8$) as the stabilizer.

The stability tests were carried out on this composition under the same conditions as in Example 1.

The results obtained are shown in Table II below.

TABLE II

| Temperature | Duration | Stabilizer | % Decomposition |
|---|---|---|---|
| 180° C. | 100 h | OLOA 267 | ≦0.1% |
| 180° C. | 100 h | OLOA 4269 | ≦0.1% |

The zinc dialkyl-dithiophosphates used in this example are marketed by ORO GIL under the tradename OLOA.

COMPARATIVE EXAMPLE

By way of comparison, heat transfer compositions were prepared without a stabilizer and their stability was studied under the same conditions as the compositions according to Examples 1 to 2 above.

The results obtained are collated in Table III below.

TABLE III

| Mixture | | | Experimental conditions | | | Results |
|---|---|---|---|---|---|---|
| Hydrocarbon | Solvent | Material | Temperature °C. | Duration hours | Stabilizer | % Decomposition |
| R124 | NMP | stainless steel | 180° C. | 100 | none | 71% |
| R133a | NMP | stainless steel | 180° C. | 100 | none | 93% |
| R124 | NMP | ordinary steel | 180° C. | 100 | none | 55% |
| R133a | NMP | ordinary steel | 180° C. | 100 | none | 76% |

R124 = 1-chloro-1,2,2,2-tetrafluoroethane, $CF_3$—$CHFCl$
R133a = 1-chloro-2,2,2-trifluoroethane, $CF_3$—$CH_2Cl$ The results collated in Tables I to III above show that the compositions according to the invention are heat-stable.

What is claimed is:

1. Stable heat transfer compositions for use as heat transfer fluids in absorption heat pumps of the type comprising a chlorofluorohydrocarbon as the heat transfer agent and an amide or glycol ether solvent, said composition containing a stabilizer which is a zinc dialkyldithiophosphate of the chemical formula:

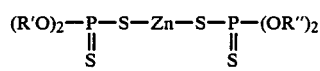

in which R' and R'', which are identical or different, and represent alkyl, aryl, alkylaryl or arylalkyl radicals containing at least 3 carbon atoms.

2. Stable heat transfer compositions as claimed in claim 1, wherein the chlorofluorohydrocarbon is chosen from the group consisting of chlorodifluoromethane, dichlorofluoromethane, chlorofluoromethane, 1,1-dichloro-2,2,2-trifluoroethane, 1-chloro-1,2,2,2-tetrafluoroethane, 1,1-dichloro-2,2-difluoroethane, 1- chloro-2,2,2-trifluoroethane, 1-chloro-2,2-difluoroethane and 1-chloro-1,2,2-trifluoroethane.

3. Stable heat transfer compositions as claimed in claim 1, wherein the amide compound used as a solvent is chosen from the group consisting of N,N-dimethylformamide, N,N-diethylformamide, N-methylpyrrolidone, N,N-dimethylpropionamide and mixtures thereof.

4. Stable heat transfer compositions as claimed in claim 1, wherein the solvent is chosen from the group consisting of triethylene glycol dimethyl ether or tetraethylene glycol dimethyl ether.

5. Stable heat transfer compositions as claimed in claim 1, wherein the said stable mixture contains 0.05 to 2.5% by weight of the stabilizer, relative to the weight of the solvent.

6. Stable heat transfer compositions as claimed in claim 1, wherein the heat transfer fluid in the said stable mixture is 1-chloro-1,2,2,2-tetrafluoroethane, the solvent fluid is N-methylpyrrolidone and the stabilizer is a zinc dialkyl-dithiophosphate, the alkyl group being $C_4$–$C_8$.

7. Stable heat transfer compositions as claimed in claim 1, wherein the proportion of chlorofluorohydrocarbon in the said stable mixture is 10 to 60%, relative to the weight of the mixture.

8. A method of transferring heat in absorption type heat pump systems which comprises using as the heat exchange medium stabilized mixtures of chlorofluorohydrocarbons and solvents, said mixtures comprising as the heat transfer fluid a chlorofluorohydrocarbon, an amide or glycol ether compound as solvent and as stabilizer a zinc dialkyl-dithiophosphate of the chemical formula:

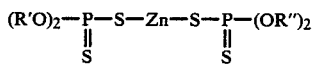

in which R′ and R″, which are identical or different, represent alkyl, aryl, alkylaryl or arylalkyl radicals containing at least 3 carbon atoms.

9. A method according to claim 8, wherein the chlorofluorohydrocarbon is chosen from the group consisting of chlorodifluoromethane, dichlorofluoromethane, chlorofluoromethane, 1,1-dichloro-2,2,2-trifluoroethane, 1-chloro-1,2,2,2-tetrafluoroethane, 1,1-dichloro-2,2-difluoroethane, 1-chloro-2,2,2-trifluoroethane, 1-chloro-2,2-difluoroethane and 1-chloro-1,2,2-trifluoroethane.

10. A method according to claim 8, wherein the amide compound used as a solvent is chosen from the group consisting of N,N-dimethylformamide, N,N-diethylformamide, N-methylpyrrolidone, N,N-dimethylpropionamide and mixtures thereof.

11. A method according to claim 8, wherein the solvent is chosen from the group consisting of triethylene glycol dimethyl ether or tetraethylene glycol dimethyl ether.

12. A method according to claim 8, wherein the said stable mixture contains 0.05 to 2.5% by weight of the stabilizer, relative to the weight of the solvent.

13. A method according to claim 8, wherein the heat transfer fluid in the said stable mixture is 1-chloro-1,2,2,2-tetrafluoroethane, the solvent fluid is N-methylpyrrolidone and the stabilizer is a zinc dialkyl-dithiophosphate, the alkyl group being $C_4$–$C_8$.

14. A method according to claim 8, wherein the proportion of chlorofluorohydrocarbon in the said stable mixture is 10 to 60%, relative to the weight of the mixture.

15. Stable heat transfer compositions as claimed in claim 1 in which R′ and R″, which are identical or different, represent alkyl, aryl, alkylaryl, or arylalkyl radicals having at least six carbon atoms.

16. Stable heat transfer compositions as claimed in claim 5 wherein the mixture contains from 0.5 to 2% by weight of the stabilizer.

17. A method according to claim 8, wherein the stable mixture contains 0.5 to 2% by weight of the stabilizer, relative to the weight of the solvent.

* * * * *